United States Patent [19]

Battle

[11] 4,075,563
[45] Feb. 21, 1978

[54] DIGITAL LOOP DETECTOR WITH IMPROVED DETECTION CONTROL

[75] Inventor: Francis L. Battle, Davenport, Iowa

[73] Assignee: Gulf & Western Industries, Inc., New York, N.Y.

[21] Appl. No.: 686,026

[22] Filed: May 13, 1976

[51] Int. Cl.² .......................................... G01R 33/12
[52] U.S. Cl. .................................. 324/236; 340/38 L
[58] Field of Search .................... 324/41, 78 R, 78 D, 324/79 D; 340/38 L, 258 C; 235/177

[56] References Cited

U.S. PATENT DOCUMENTS

| | | | |
|---|---|---|---|
| 3,196,262 | 7/1965 | Thompson | 235/177 |
| 3,680,046 | 7/1972 | Bergey et al. | 235/177 |
| 3,868,626 | 2/1975 | Masher | 340/38 L |
| 3,873,964 | 3/1975 | Potter | 340/38 L |
| 3,875,555 | 4/1975 | Potter | 340/38 L |
| 3,943,339 | 3/1976 | Koerner et al. | 340/38 L |
| 3,989,932 | 11/1976 | Koerner | 340/38 L |

FOREIGN PATENT DOCUMENTS 1,398,937  6/1975  United Kingdom ............... 340/38 L

OTHER PUBLICATIONS

Brackney et al. Pulse Comparator Circuit Messures Freq. Jitter, Electronics, July 7, 1961; pp. 54–56.

Primary Examiner—Robert J. Corcoran
Attorney, Agent, or Firm—Meyer, Tilberry & Body

[57] ABSTRACT

An improvement in a digital device for detecting a metal object in the field of influence of an oscillator controlling loop, which digital device includes counter means for counting pulses during a counting interval, with the magnitude of the pulse count during the interval being indicative of the metal detected by the loop. The improvement includes means for creating a group of binary logic signals indicative of the difference between the pulse count and a selected reference count, these signals are allocated from a least significant to a more significant binary number, and reading means for reading the logic of at least some of the binary logic signals, which reading device includes means for indicating a detection when the signal being read has a selected binary logic pattern.

9 Claims, 8 Drawing Figures

FIG. 3A

EXAMPLE A (COUNT$_n$ > COUNT$_{n-1}$)

| | |
|---|---|
| COUNT$_{n-1}$ | 1 1 0 1 0 1 1 |
| $\overline{\text{COUNT}_{n-1}}$ | 0 0 1 0 1 0 0 |
| COUNT$_n$ | 1 1 0 1 1 0 1 |
| FULL ADD | C←0 0 0 0 0 0 1 |
| RESULT | $\underline{\text{C} \rightarrow 1}$ 0 0 0 0 0 1 0 |

∴ A1=0 ∴ X=0 (NO DETECTION)

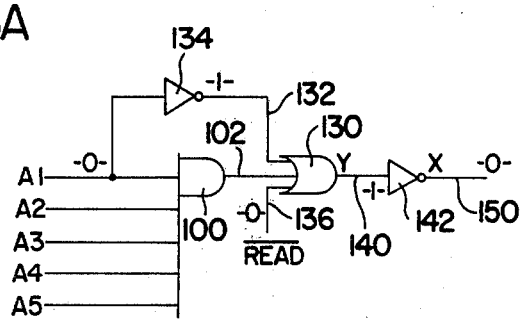

FIG. 3B

EXAMPLE B (COUNT$_n$ = COUNT$_{n-1}$)

| | |
|---|---|
| COUNT$_{n-1}$ | 1 1 0 1 0 1 1 |
| $\overline{\text{COUNT}_{n-1}}$ | 0 0 1 0 1 0 0 |
| COUNT$_n$ | 1 1 0 1 0 1 1 |
| FULL ADD | 1 1 1 1 1 1 1 |

A1–A5=1 ∴ Y=1, X=0

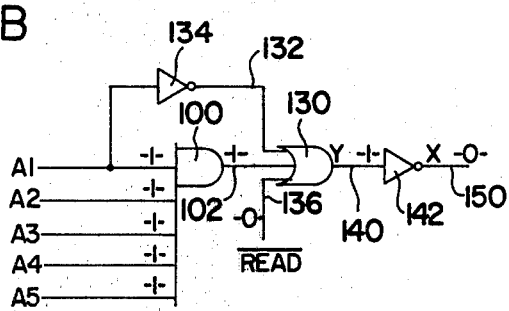

FIG. 3C

EXAMPLE C (COUNT$_n$ < COUNT$_{n-1}$ BY LESS THAN THRESHOLD)

| | |
|---|---|
| COUNT$_{n-1}$ | 1 1 0 1 0 1 1 |
| $\overline{\text{COUNT}_{n-1}}$ | 0 0 1 0 1 0 0 |
| COUNT$_n$ | 1 1 0 1 0 0 1 |
| FULL ADD | 1 1 1 1 1 0 1 |

A1–A5=1 ∴ Y=1, X=0

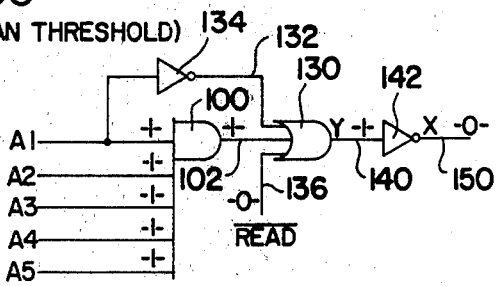

FIG. 3D

EXAMPLE D (COUNT$_n$ < COUNT$_{n-1}$ BY THRESHOLD OR MORE)

| | |
|---|---|
| COUNT$_{n-1}$ | 1 1 0 1 0 1 1 |
| $\overline{\text{COUNT}_{n-1}}$ | 0 0 1 0 1 0 0 |
| COUNT$_n$ | 1 1 0 0 1 0 1 |
| FULL ADD | 1 1 1 1 0 0 1 |

A5=0 ∴ Y=0, X=1 (DETECTION)

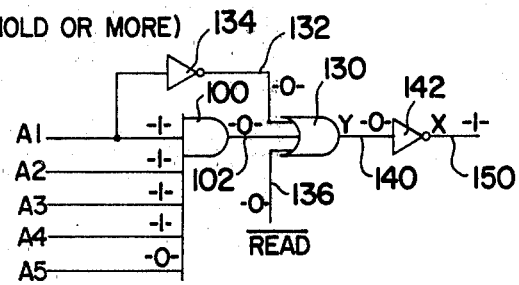

DIGITAL LOOP DETECTOR WITH IMPROVED DETECTION CONTROL

This invention relates to the art of digital loop detectors of the type used in detecting the presence of an electrically conductive mass in a field of influence generated by the loop and more particularly a digital loop detector having an improved detection control or sensitivity system.

The invention is particularly applicable for a digital loop detector used in detecting the presence of transitory vehicles residing in or entering and/or leaving a selected area or zone in, or associated with a traffic intersection or selected area in a roadway and it will be described with particular reference thereto; however, the invention has much broader applications and may be used in other environments wherein the presence and/or absence of a metal object or other electrically conductive mass is to be detected without physical contact with the object or mass.

BACKGROUND OF INVENTION

For a number of years, traffic control systems for controlling vehicle movement through intersections have been controlled, to various extents, by detectors which detect the number of vehicles entering the vicinity of the intersection. At first, these detectors were pressure treadles and other devices mechanically actuated by a passing vehicle. Such detectors were susceptible to deterioration and climate variations; therefore, other detectors were developed which did not function on mechanical principles. These involved radar sensors magnetic pick-ups, sonar units and induction loop pick-ups. Of these, one of the most prominently used mechanisms was the induction loop controlled detector. In this device, a loop is embedded in a roadway adjacent the intersection and the inductance of the loop is affected by vehicles entering and leaving the field of influence of the loop. In initial systems, the loop was connected to an oscillator. Changes in the frequency, and/or amplitude of the oscillator output were analyzed by analog circuits for indicating a vehicle detection. Although extensively used, this type of analog system was not extremely sensitive and varied substantially with ambient conditions. In an attempt to diminish the effect of ambient conditions, some systems were provided with a fixed frequency oscillator which was beat with the loop oscillator to produce an analog signal representative of the presence of metal within the field of influence of the detecting loop. These systems did not prove extremely satisfactory because the ambient conditions still affected the operation of the loop, irrespective of the presence of metal in its field of influence. Thus, these systems often involved a feedback tuning arrangement for the fixed frequency oscillator which attempted to bring the loop oscillator and reference oscillator into a controlled relationship preparatory to detection. The feedback tuning arrangements for the fixed frequency oscillator presented difficulties which were compounded by the analog nature of the total detector systems.

These disadvantages of prior attempts to use a loop detector were overcome by a digital detecting arrangement disclosed in U.S. Pat. No. 3,868,626. In this prior patent, two oscillators are employed. One oscillator has a fixed frequency and the other oscillator has a frequency varied according to the condition of the detecting loop. This type of system creates a pulse count during a counting interval. Detection can be recorded either by varying the counting interval by the loop controlled oscillator or by varying the rate of count by the loop controlled oscillator. In either of these arrangements, when the pulse count of a given counting interval differs from a reference count, by a threshold number of magnitude, a detection is indicated. These systems have been quite successful in overcoming the disadvantages of prior systems for using a loop to detect the presence of a vehicle adjacent an intersection. The oscillators do not require periodic tuning with respect to each other during continued operation of the detector. The detection is positive and the sensitivity of the detector system can be controlled by changing the threshold number or magnitude.

The present invention relates to an improvement in the digital detector shown in U.S. Pat. No. 3,868,626, which improvement involves a new system for comparing the pulse count to a reference count. This new system produces a coded signal output representative of the difference between the pulse count and the reference count. In addition, the sensitivity of the new system is substantially improved by employing a means for reading the coded signals and determining whether or not they exceed a magnitude which is adjusted to change the sensitivity of the loop detector. In this manner, the sensitivity may be varied over a wide range without being affected by the parameters of the loop and any interference with the loop detecting field.

OTHER PRIOR PATENTS RELATING TO DIGITAL LOOP DETECTORS

U.S. Pat. No. 3,873,964 and U.S. Pat. No. 3,875,555 each related to a digital loop detector and are made of record in this specification. Each of these systems involves the variation of either the loop oscillator or the reference oscillator for tuning the two oscillators to a selected position which is not required in the present invention.

STATEMENT OF INVENTION

In accordance with the invention there is provided an improvement in a digital device for detecting a metal object in the field of influence of an oscillator controlling loop, which digital device includes counting means for counting pulses during a counting interval with the magnitude of the pulse count during the interval being indicative of metal detected by the loop and first digital means for indicating when the pulse count differs from a selected count by a number greater than a selected threshold number. The improvement includes a second digital means for creating a digital output signal representing the magnitude of the difference between the pulse count and the selected count and the first digital means includes reading means for indicating when the digital output signal represents a magnitude greater than the threshold number.

By using this invention, the difference between a pulse count and a selected, or reference, count is exhibited as a group of binary coded logic signals which represents the magnitude of the difference between these two counts. Then, an appropriate reading device, such as a logic gate, reads the output signals and determines whether they exceed a preselected magnitude, which is the threshold number of magnitude. By changing the number of signals being read in the lesser significant range or by changing the maximum count value, the sensitivity of the detector is varied. A full adder can add the complement of one of the counts to the other count to provide a difference reading which can be read by an appropriate binary logic, such as a gate. In this manner, a convenient arrangement can be used for changing the sensitivity of the detector without being affected by the parameters of the detector loop. Also, this arrangement allows an adjustment between a very sensitive arrangement and a relatively low sensitivity arrangement without complex circuitry.

The present invention converts the differential between the count of the last counting interval and the count of a counting interval prior to the last counting interval into a binary code, such as a group of binary logic signals in which each respective binary signal in the group represents a magnitude of the differential over a range of binary magnitudes. An appropriate reading device, such as a logic gate, reads the binary logic signals and determines whether the signals so read distinguish from one or more predetermined binary logic signals. By reading and distinguishing the binary logic signals one from the other in the group of binary logic signals, a threshold may be selected. By changing the codification or reading base or reading factor of the magnitude of the differential coded into the binary logic signals, the sensitivity of the detector may be varied without changing the count operation of the detector. In one form of the invention, the difference between the pulse count of the last counting interval and the pulse count of a prior counting interval is converted into a selected binary logic signal from a group of possible binary signals. The group of signals which may be selected represents a range of the magnitude of the difference between the two counts and the actual binary logic signal exhibited representing a particular magnitude. A reading device reads the binary coded logic signals, and determines whether such signals represent at least a preselected magnitude of differential or a threshold difference. By changing the binary code of the logic signals or by changing the number of signals being read in the lesser significant range, or by changing the other comparison factors, the sensitivity of the detector may be varied without changing the interval or pulse counting and time interval operation of the detector device. The response time can be changed by varying the length of the counting interval.

The primary object of the present invention is the provision of a digital loop detector of the type comparing a pulse count with a reference count, which detector has a coded binary output which is read for determination of a detection.

Still another object of the present invention is the provision of a digital loop detector of the type described above, which detector allows a sensitivity selection over a large range of sensitivities.

Still a further object of the present invention is the provision of a digital loop detector of the type described above, which loop detector allows a sensitivity selection independent of loop parameters.

Yet a further object of the present invention is the provision of a digital loop detector of the type described above, which detector does not employ an overflow count threshold concept.

Yet a further object of the present invention is the provision of a digital loop detector of the type described above, which detector can be used with various count sampling methods.

These and other objects and advantages will become apparent in the following description taken together with the accompanying drawings.

BRIEF DESCRIPTION OF THE DRAWINGS

In the drawings of this application, the following views are found:

FIGS. 3A-3D are numerical examples of the invention; and,

PREFERRED EMBODIMENT OF THE INVENTION

Figure 1:
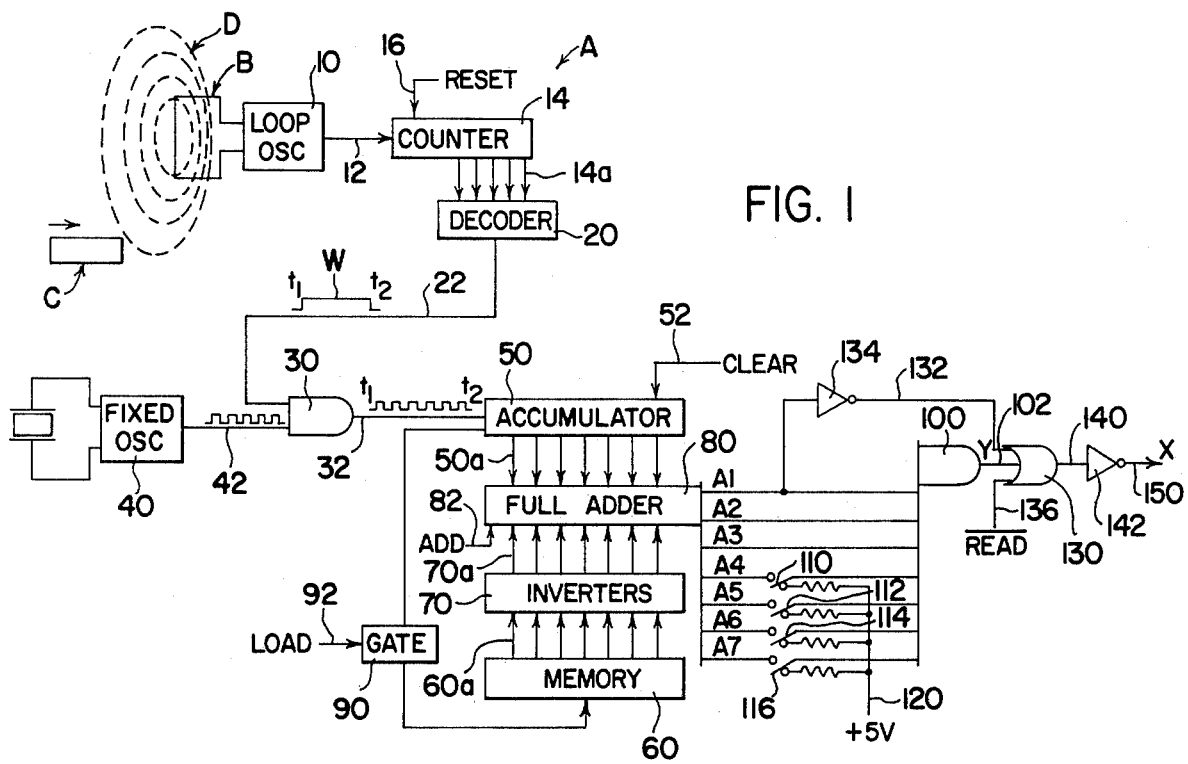
FIG. 1 is a schematic logic diagram illustrating the preferred embodiment of the present invention.

Referring now to the drawings, wherein the showings are for the purpose of illustrating a preferred embodiment of the invention only, and not for the purpose of limiting same, FIG. 1 shows a digital loop detector device or system A which is controlled by a loop B for detecting the presence of a metal object, such as a vehicle C, as it passes into the field of influence D of the loop. Prior U.S. Pat. No. 3,868,626 is incorporated by reference herein as general background for this type of digital loop detector. In accordance with the preferred embodiment of the invention, loop B controls the frequency appearing at output line 12. This output line is directed to the counting input of binary counter 14 which is reset by an appropriate signal on reset line 16. The outputs 14a of counter 14 are decoded by device 20 to create a logic signal having a length $t_1$-$t_2$. The length of this signal, or count window, is controlled by the frequency of oscillator 10 and the response count of decoder 20. As the frequency increases, count window W decreases in length. The reverse is also true. Count window W appears on output line 22 of decoder 20 and forms the first input of a counting AND gate 30 having an output 32. A fixed frequency, crystal controlled oscillator 40 has an output 42, which directs a continuous fixed frequency pulse train to the second input of gate 30. As so far described, during a counting interval determined by the length of window W, output 32 receives counting pulses, the number of which is determined by the length of window W. Thus, as the frequency of oscillator 10 is increased by variations at loop B, a lesser number or lower pulse count appears at line 32 during window W. If the frequency of oscillator 10 decreases, window W increases to create a larger pulse count at line 32 during the counting interval or counting window W. The nominal length of window W can be changed to vary the response time of system A.

System A processes the count pulse of a counting interval to determine a detection by using an accumulator 50 having a series of stages, seven of which are illustrated as lines 50a. The binary logic or these lines after a counting interval represents the accumulated pulse count during one sampling by system A. A signal on line 52 clears accumulator 50 to all zeros prior to the appearance of count window W. A memory 60 has a plurality of stages corresponding to the stages of the accumulator 50 and the logic of each of these stages appears in output lines 60a, which correspond in number to the stages of accumulator 50. A variety of arrangements could be used for obtaining the memory count positioned in memory 60, which is a read/write type of memory. The output logic on lines 60a is directed to the input of a complementor or inverters 70 which invert the logic of the memory stages before it is introduced through lines 70a to the various stages of a full adder 80. This full adder also is controlled, in a coordinated manner, with output lines 50a of accumulator 50. Thus, full adder 80 adds the accumulated pulse count of accumulator 50 to the complement of the reference count 60. This can be done by a variety of arrangements, one of which is a signal or pulse received in illustrated add line 82.

In accordance with the preferred embodiment of the invention, after each window W, the accumulated pulse count in accumulator 50 is loaded by gate 90, into memory 60. This loading is parallel in practice; however, it can be serial. Thus, during each processing cycle, the pulse count is being compared with a previous pulse count. The new pulse count is then used as the reference count. Of course, it need not be a previous pulse count in memory 60 since in some instances it is possible to use other previous pulse counts. Memory 60 is then loaded by gage 90 upon receipt of a LOAD pulse or signal in line 92. This occurs after a pulse window has been processed.

In accordance with standard practice, full adder 80 includes a plurality of output lines each of which has a binary logic controlled by the results of the adding function when an ADD signal is received in line 82. In accordance with the preferred embodiment of the invention, full adder 80 includes the known arrangement for transferring a carry over from the most significant bit to the least significant bit and totalizing this result. This is common practice in the "ones complement" type of subtraction which is employed by system A. In other words, when subtracting by using a full adder, one number is complemented and added. Any carry over in the most significant bit is directed to the least significant bit of the added result to produce the true difference of the two members. This is common practice in the digital computer art. The end around carry over may be omitted for simplicity. Thus, the binary coded logic appears on output lines A1–A7 of full adder 80, with A1 being the most significant bit and A7 being the least significant bit. The significance of the bits increases successively from A7 to A1. Of course, the number of digits in the accumulator, memory, inverters and the full adder can be varied in accordance with the desired sensitivity and the number of counts being accumulated during the counting interval. To read the logic signals grouped on output lines A1–A7 of full adder 80, there is provided an appropriate reading system or network, which, in the preferred embodiment, includes an AND gate 100 having a series of inputs controlled by the logic on lines A1–A7. In practice, lines A6 and A7, the two least significant bits, are not directed to the input of gate 100. A certain number of the least significant bits are provided with switches, which can be mechanical or logic switches, 110, 112, 114 and 116. Of course, the number of these switches can be changed to alter the sensitivity selection by lines A4–A7, respectively, to the input of gate 100. In the opposite positions, these switches connect the inputs of gate 100 with a positive logic source 120, illustrated as a five volt D.C. power source. The output 102 of gate 100 is connected to the input of OR gate 130. Another input 132 is communicated with output line A1 of full adder 80 through inverter 134, for a purpose to be described later. The other input 136 of gate 130 receives a negative logic or logic 0 pulse during the reading cycle of the network shown in FIG. 1. Gate 130 includes an output line 140 which has a binary logic inverted by inverter 142 to produce a detection logic in line 150. In the illustrated embodiment, the detection logic is a logic 1 when a detection has occurred.

Figure 2:
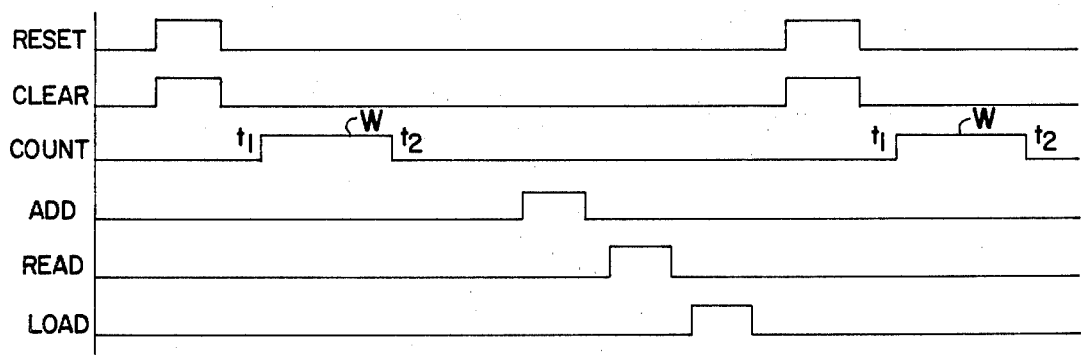
FIG. 2 is a pulse diagram illustrating pulses employed in the preferred embodiment, as illustrated in FIG. 1.

Referring now to FIG. 2, the pulses shown in the illustrated embodiment are set forth schematically. As can be seen, the RESET and CLEAR pulses for counter 14 and accumulator 50, respectively, appear at the same time. This starts counter 14 after an initial reset condition. Window W can be started at the same time in which instance time $t_1$ would coincide with the disappearance of the RESET pulse. However, it can be shifted slightly from the RESET pulse as shown in FIG. 2. During the counting window, gate 30 is opened so that line 32 receives counting pulses which are directed to the input of accumulator 50. At time $t_2$, the logic of line 22 shifts to a logic 0 closing window W and gate 30. At this instance, accumulator 50 has accumulated a binary count representative of the amount of metal detected in the field of influence of loop B. Thus, lines 50a have a binary count representation of a current pulse count. Lines 70a have the complement of the previous pulse count, which is used as reference count to determine changes in the frequency of oscillator 10. At that time, the ADD pulse is received by adder 80. This causes full adder 80 to compete its adding function with a carry over from the most significant to the least significant bit. At that time, the outputs A1–A7 contain the binary number representing and corresponding to the difference in the new pulse count and the previous reference pulse count. At that time, the $\overline{\text{READ}}$ pulse is received to open gate 130 which has been held to produce a logic 1 in line 140. During the reading function, A detection will create a logic 0 in line 140 and a logic 1 at point X, which is line 150. After the reading function, the LOAD pulse is created to open gate 90 and load member 60 with the accumulated pulse count in accumulator 50. Thereafter, the sequence is repeated as shown in FIG. 2.

In operation, the sensitivity of system A is controlled by closing one or more of the switches 110–116. For the most sensitive condition, switches 110–116 would be closed. However, switches 114 and 116 are generally left opened or output A7 is not connected to gate 100. The sensitivity created by closing switch 116 of the least significant bit is generally too sensitive during normal operations. The next most sensitive switch is switch 114. When switches 110–114 are closed, minor differences between the pulse count and the reference count will create a logic 0 at point Y. This logic 0 will combine with a logic 0 in each of lines 132 and 136 to create a detection signal. The next lesser sensitivity switch is switch 112. The least sensitive switch is switch 110. Of course, a variety of switches of output lines could be used according to the sensitivity desired. In practice, the sensitivity is adjusted to allow a certain amount of difference without causing a detection. In this manner, small variations in the pulse count will be lost during each cycle since the new count will be introduced into memory 60. Thus, if the difference between the accumulated count and the previous reference count does not exceed a number, known as a threshold number or amount, this difference is eliminated by gating the new reference count into memory 60. If the difference exceeds the threshold adjusted number determined by the least significant switch closed, a detection is indicated. When a vehicle is detected, the is a rapid change in loop oscillator frequency which allows a threshold difference between adjacent pulse counts. The circuitry for utilizing the detection signal can vary according to the type of environment to which the device A is being applied.

Figure 3:
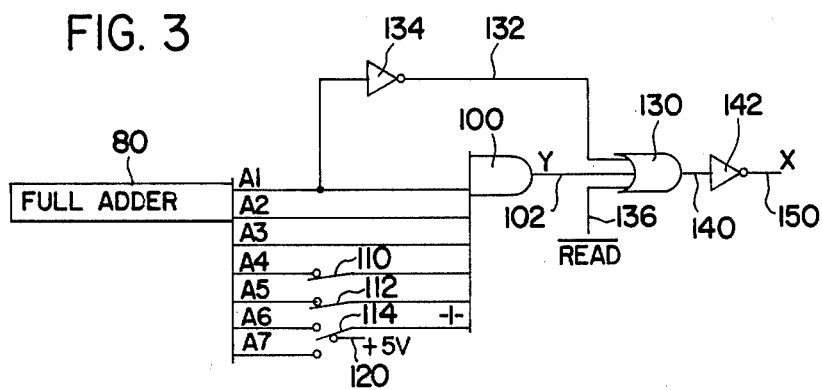
FIG. 3 is a partial view of the preferred embodiment together with certain numerical operations performed by the preferred embodiment as illustrated in FIG. 1.

Referring now to FIG. 3, the output of full adder 80 is illustrated with switches 110, 112 closed. Switch 114 is opened to apply a continuous logic 1 at one input of gate 100. Output 47 of full adder 80 is not used in the particular example since it produces an over sensitive arrangement which is generally not required in practice. Also, if the carry over is not shifted to the least significant digit as shown in FIG. 3A, the use of line A7 would produce a slight error. Referring now to the numerical Examples A-D of FIGS. 3A-D, in Example A, the new pulse count is greater than the old pulse count stored in memory 60. In that instance, as shown in the binary calculations, output line A1 is at a logic 0. In this instance, line 132 is at a logic 1. This produces a fixed logic 1 at point Y so that there is no detection signal at point X. In this particular example, the accumulated count has increased over a previous reference count. In the preferred embodiment, this count increase is opposite the count change experienced during detection. Thus, this drift of the count in an upward direction is generally indicative of ambient or parameter changes which will be quite slight. Thus, the next successive count will eliminate the slight upward drift of the count.

In Example B, the new pulse count and reference count are the same. When this happens, a logic 1 appears in all outputs from the full adder 80. Thus, a logic 1 appears in line 102 to produce a logic 1 in line 104 at point Y. There is a no detection condition which produces a logic 0 in line 150.

In Example C of FIG. 3C, the new pulse count is less than the old pulse count by less than the threshold number or magnitude. This magnitude is controlled by the positioning of switches 110-114. In the particular example, sensitivity is selected by closing all switches more significant than switch 114. Thus, switches 110, 112 are closed and switch 114 is opened, as shown in FIG. 3. A lesser sensitivity would require opening of switch 112 or both switches 110, 112. When the new pulse count is not less than the previous pulse count by the threshold number or magnitude, all ones appear in outputs A1--A5. This produces a logic 1 in line 102 which, in accordance with previous discussions, produces a no detection condition.

In Example D of FIG. 3D, a vehicle is detected. The difference between a previous reference count and the new count is greater than the threshold number or magnitude. In this instance, a logic 0 appears in output A5 of full adder 80. When this happens, a logic 0 appears in line 102. Since a logic 1 also appears in output A1, line 132 is also at a logic 0. When a logic 0 appears in line 136 during READ pulse, a logic 0 then appears in line 140 at point Y.

Logic 1 appears in line 150 at point X to indicate a detection. A rapid decrease in the counting pulse caused by an increase in the oscillator frequency creates a detection signal which can be used for any purpose, such as controlling a traffic control signal.

MODIFICATION OF THE PREFERRED EMBODIMENT

Figure 4:
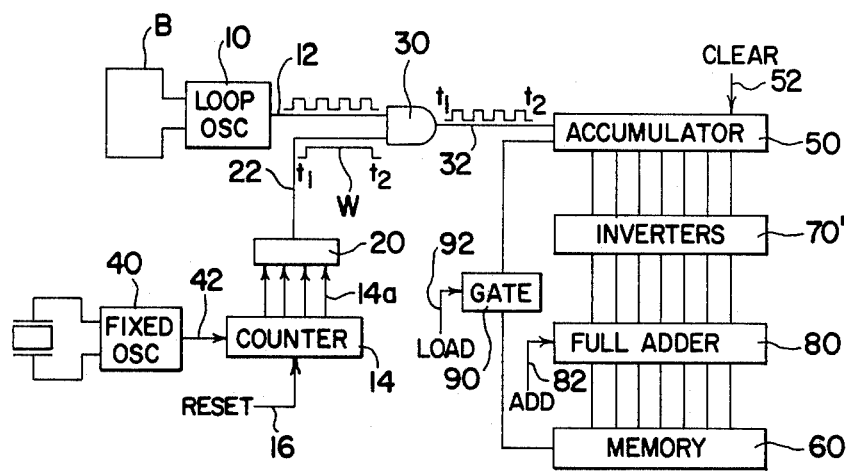
FIG. 4 is a partial logic diagram showing a modification of the preferred embodiment as illustrated in FIG. 1 with a different input operational mode.

Referring now to FIG. 4, a modification of the preferred embodiment shown in FIG. 1 is illustrated. Like parts have like numbers; however, they are arranged in a different pattern so that the window W is controlled by the fixed frequency oscillator 40 instead of by the variable frequency oscillator 10. In this manner, the window between $t_1$ and $t_2$ is fixed. The pulse count in line 32 during a counting interval is still controlled by the frequency of loop oscillator 10. As this frequency increases, the new pulse count recorded by accumulator 50 increases during the counting interval. Thus, in a detection situation the new pulse count exceeds the old pulse count or reference count. To determine this difference, the new pulse count can be inverted or complemented and then introduced to one input interface of full adder 80. In this manner, the difference between the two pulses can be obtained in a manner similar to the preferred embodiment of the invention. The output reading circuit is then controlled by a logic pattern on the output lines of full adder 80.

In both embodiments of the invention, a selected binary logic pattern which is read by a logic reading device or network will indicate a detection. The selected pattern in the illustrated embodiment, is the existence of a blocking signal in any of the output lines A1-A7 communicated to the several inputs of gate 100. Switches 110-116 are used to introduce constant non-blocking logic to the inputs of gate 100 to place the lesser significant bits in a condition that they may not cause a detection signal. Other reading arrangements could be used for detecting a particular selected pattern which is indicative of a metal object to be detected appearing in the field of influence of loop B. In the illustrated embodiment, the read network looks for a selected pattern or the existence of a selected pattern for producing a detection signal. This pattern could be varied without departing from the intended spirit and scope of the present invention. Although it is preferred to obtain the reference count from a prior pulse count, it is possible to create the reference count by other arrangements without departing from the present invention.

Having thus defined the invention, it is claimed:

1. In a digital detector device for detecting a metal object in the field of influence of a detector loop controlling the frequency of pulses created by an oscillator, said digital detector device including counter means for counting said pulses created by said oscillator during a counting interval having a selected duration whereby the magnitude of the pulses counted during said controlled interval is indicative of the inductance of said loop and digital means for creating an output signal when the number of pulses counted by said counter means for a given counting interval differs from a selected count by a number greater than a selected threshold number, the improvement comprising: said digital means including means for creating a binary coded signal having a series of binary bits arranged in a selected order for indicating the difference between said number of counted pulses and said selected count; a binary logic circuit having a plurality of input lines individually corresponding to said bits and divided into first and second groups, an output line and means for creating said output signal in said output line when the logic on one of said input lines is at a selected binary logic value; a source of binary logic value opposite to said selected binary logic value; separate sensitivity switch means for selectively shifting said input lines of said first group between a first position where said associated input line has a binary condition controlled by a corresponding one of said binary bits and a second position where said associated input line has a binary condition controlled by said binary logic source; means for directing bits of binary logic to corresponding input lines of said second group of input lines; and, means for inhibiting creation of said output signal when a selected one of said input lines in said second group is at said selected binary logic value.

2. In a digital detector device for detecting a metal object in the field of influence of a detector loop controlling the frequency of pulses created by an oscillator, said digital detector device including counter means for counting said pulses created by said oscillator during a counting interval having a selected duration whereby the magnitude of the pulses counted during said controlled interval is indicative of the inductance of said loop and digital means for creating an output signal when the number of pulses counted by said counter means for a given counting interval differs from a selected count by a number greater than a selected threshold number, the improvement comprising: said digital means including means for creating a multiple digit binary representation of the difference between said pulse count and said selected count, said binary representation progressing numerically from a least significant digit to a most significant digit; a number of output elements; means for directing the binary logic of each of said digits to corresponding different ones of said elements with a particular element receiving binary logic from said most significant digit; means for creating said output signal when at least one of a plurality of said elements other than said particular element receives a given binary logic from said directing means; and, means for selectively preventing selected ones of said elements from shifting to said given binary logic whereby said threshold number is changeable.

3. The improvement as defined in claim 2 wherein said selected ones of said elements are said elements to which said least significant digits are directed by said directing means.

4. The improvement as defined in claim 2 wherein said preventing means includes a switch means connected to each of said selected ones of said elements, each of said switch means being movable between a first position with its associated element accepting the logic of a digit of said binary representation and a second position with its associated element receiving a fixed logic opposite to said given binary logic.

5. The improvement as defined in claim 2 including means for inhibiting creation of said output signal when said particular element is at said given binary logic.

6. In a digital detector device for detecting a metal object in the field of influence of a detector loop controlling the frequency of output pulses of a first variable frequency oscillator, a fixed frequency oscillator means for creating fixed frequency pulses, said detector means including counter means for counting one of said pulses for a counting interval controlled by the other of said pulses to provide a pulse count for a given interval indicative of the frequency of said variable frequency oscillator, the improvement comprising: means for creating a group of binary logic signals arranged from numerically least significant to numerically most significant digits and indicative of the numerical difference between said pulse count and a selected reference count; a group of signal receiving elements, each of said elements receiving a single, different one of said binary logic signals; a first logic means having a plurality of inputs and an output for creating a given binary logic on said output when one of said inputs receives a selected binary logic; a plurality of said inputs of said first logic means connected directly to said elements receiving binary logic signals corresponding to said binary signals numerically adjacent said most significant digit; the remaining inputs of said first logic means each including manually operated switching means having a first condition connecting one of said remaining inputs to elements receiving one of said binary logic signals corresponding to said binary logic signals numerically adjacent said least significant digit and a second condition connecting said one of said remaining inputs to a source of binary logic binarily opposite to said selected binary logic whereby the sensitivity of said first logic means may be varied by said switching means; a second logic means having an output and a plurality of inputs for creating a detection signal in said output when said inputs each receive a known binary logic signal; one of said inputs of said second logic means being controlled by said output of said first logic means with said known binary logic of said one input being said given binary logic and another of said inputs of said second logic means being controlled by the binary logic on one of said signal receiving elements, said another input having the known binary logic signal when said group of binary logic signals indicates a detection difference between said pulse count and said reference count.

7. In a digital detector device for detecting a metal object in the field of influence of a detector loop controlling the frequency of output pulses of a first variable frequency oscillator, a fixed frequency oscillator means for creating fixed frequency pulses, said detector means including counter means for counting one of said pulses for a counting interval controlled by the other of said pulses to provide a pulse count for a given interval indicative of the frequency of said variable frequency oscillator, the improvement comprising: means for creating in signal receiving elements a group of binary logic signals with the signals on the elements being indicative of the difference between said pulse count and a selected reference count; logic means with an output and several inputs for creating a detection signal in said output when at least one of said inputs receives a known binary logic signal; means for connecting certain ones of said inputs directly to ones of said elements; and switch means for shifting other of said inputs between a first position with said input connected to a source of binary logic opposite to said known binary logic and a second position with said input connected to one of said elements different from said ones of said elements connected directly to one of said inputs of said logic means.

8. In a digital detector device for detecting a metal object in the field of influence of a detector loop controlling the frequency of output pulses of a first variable frequency oscillator, a fixed frequency oscillator means for creating fixed frequency pulses, said detector means including counter means for counting one of said pulses for a counting interval controlled by the other of said pulses to provide a pulse count for a given interval indicative of the frequency of said variable frequency oscillator, the improvement comprising: means for creating a group of binary logic signals arranged from numerical least significant to numerical most significant digits and indicative of the numerical difference between said pulse count and a selected reference count; a binary reading means having an output and several inputs, said binary reading means includes means for shifting said output to a first binary logic condition only when all of said inputs are at a known binary logic; a detection logic device having an output and inputs and means for shifting said output to a given binary logic condition when said inputs receive selected binary signals; means responsive to said given binary logic for creating a detection signal; means for connecting said output of said binary reading means to a first of said inputs of said detection logic device with said first binary logic condition being opposite to the selected binary signal of said first input of said detection logic device; conductive elements for directing each of said binary logic signals to correspondingly different ones of said several inputs of said binary reading means; and, manual switch means in said conductive elements which direct the least significant binary logic signals to said inputs of said reading means, said switch means having a manually selected position connecting said element associated with said switch means to a source of the known binary logic for said associated element.

9. In a digital detector device for detecting a metal object in the field of influence of a detector loop controlling the frequency of output pulses of a first variable frequency oscillator, a fixed frequency oscillator means for creating fixed frequency pulses, said detector means including counter means for counting one of said pulses for a counting interval controlled by the other of said pulses to provide a pulse count for a given interval indicative of the frequency of said variable frequency oscillator, the improvement comprising: means for creating a group of binary logic signals arranged from numerical least significant to numerical most significant digits and indicative of the numerical difference between said pulse count and a selected reference count; a binary reading means having an output and several inputs, said binary reading means includes means for shifting said output to a first binary logic condition only when all of said inputs are at a known binary logic; conductive elements for directing each of said binary logic signals to correspondingly different ones of said several inputs of said binary reading means; manual switch means in said conductive elements which direct the lesser significant binary logic signals to said inputs of said reading means, said switch means having a manually selected position connecting said element associated with said switch means to a source of the known binary logic for said associated element; and means for creating a detection signal when said output of said reading means is at a second logic condition opposite to said first logic condition.

* * * * *